United States Patent
Ukai et al.

(10) Patent No.: US 7,608,357 B2
(45) Date of Patent: Oct. 27, 2009

(54) FUEL ELECTRODE MATERIAL, A FUEL ELECTRODE, AND A SOLID OXIDE FUEL CELL

(75) Inventors: Kenji Ukai, Tokai (JP); Yasunobu Mizutani, Tokai (JP); Kouji Hisada, Tokai (JP); Misuzu Yokoyama, Tokai (JP); Shoji Futaki, Niihama (JP); Hiroyuki Toya, Niihama (JP)

(73) Assignees: Toho Gas Co., Ltd., Nagoya-Shi (JP); Sumitomo Metal Mining Co., Ltd., Minato-Ku (JP)

( * ) Notice: Subject to any disclaimer, the term of this patent is extended or adjusted under 35 U.S.C. 154(b) by 247 days.

(21) Appl. No.: 11/283,492

(22) Filed: Nov. 18, 2005

(65) Prior Publication Data

US 2006/0110633 A1  May 25, 2006

(30) Foreign Application Priority Data

Nov. 19, 2004 (JP) .............................. 2004-335517

(51) Int. Cl.
*H01M 2/02* (2006.01)
(52) U.S. Cl. ...................................................... 429/40
(58) Field of Classification Search .................. 429/40, 429/33, 41, 44, 45, 42, 43, 30; 427/115, 427/126.3; 502/101
See application file for complete search history.

(56) References Cited

U.S. PATENT DOCUMENTS 5,908,713 A    6/1999 Ruka et al.
6,248,468 B1 *  6/2001 Ruka et al. ..................... 429/40
6,692,855 B1    2/2004 Aizawa et al.
6,790,474 B1 *  9/2004 Hishinuma et al. .......... 427/115
2006/0127747 A1 *  6/2006 Arico et al. ..................... 429/44

FOREIGN PATENT DOCUMENTS

| EP | 1 081 778 | 3/2001 |
| EP | 1 383 195 | 1/2004 |
| JP | 9-245817 | 9/1997 |
| JP | 09-274921 A1 | 10/1997 |
| JP | 11-349333 A1 | 12/1999 |
| JP | 2001-517859 A1 | 10/2001 |
| WO | 2004/038844 | 5/2004 |

OTHER PUBLICATIONS

Mori et al., "Evaluation of Ni and Ti-doped $Y_2O_3$ stabilized $ZiO_2$ cermet as an anode in high-temperature solid oxide fuel cells," Solid State Ionics, Diffusion & Reactions Elsevier Netherlands, vol. 160, No. 1-2, May 2003, pp. 1-14.

Fouquet et al., "Kinetics of Oxidation and Reduction of Ni/YSZ Cermets,"Ionics Inst. Ionics Germany, vol. 9, No. 1-2, 2003, pp. 103-108.

* cited by examiner

*Primary Examiner*—Patrick Ryan
*Assistant Examiner*—Monique Wills
(74) *Attorney, Agent, or Firm*—Burr & Brown (57) ABSTRACT

A powder material for a fuel electrode of a solid oxide fuel cell is provided, along with a fuel electrode for a solid oxide fuel cell prepared by sintering the fuel electrode powder material, and a solid oxide fuel cell including the fuel electrode. The fuel electrode powder material includes a nickel based powder material containing at least one of nickel and nickel oxide and at least one of titanium oxide (IV) and a titanium source capable of changing into titanium oxide (IV) by heat treatment in air.

8 Claims, 3 Drawing Sheets

FUEL ELECTRODE MATERIAL, A FUEL ELECTRODE, AND A SOLID OXIDE FUEL CELL

BACKGROUND OF THE INVENTION

1. Field of the Invention

The present invention relates to a material for a fuel electrode of a solid oxide fuel cell, a fuel electrode for a solid oxide fuel cell, and a solid oxide fuel cell.

2. Description of Related Art

A solid oxide fuel cell (hereinafter referred to as "SOFC") is a fuel cell in which a solid electrolyte exhibiting oxide ion conductivity is used as an electrolyte. The basic elements of the SOFC are a fuel electrode, a solid electrolyte and an air electrode, and an assembly which is prepared by laminating these three elements in order and bonding them to form a single cell. In general, a plurality of such single cells are used to form a stack, which is employed as a power generation device.

In the SOFC having such constitution, when a fuel gas (such as hydrogen, carbon monoxide and methane) and an oxidant gas (such as air and oxygen) are supplied to the fuel electrode and the air electrode, respectively, a difference arises between oxygen partial pressure on the part of the air electrode and that on the part of the fuel electrode; therefore, oxygen changes into oxide ions in the air electrode to be moved to the part of the fuel electrode through the solid electrolyte, and the oxide ions reaching the fuel electrode react with the fuel gas to release electrons. Accordingly, connecting a load to the fuel electrode and the air electrode enables the Gibbs free energy change in a cell reaction to be directly produced as electrical energy to perform power generation.

Among the elements constituting the respective parts of the SOFC, the fuel electrode is a field of electrochemical oxidation of the fuel gas as well as a field of generation of electrons. Since there is a necessity to operate for a long time under high temperatures (700-1000° C.) and low oxygen partial pressure, the fuel electrode is generally required to have the following properties.

Specifically, the properties include (1) chemical and thermodynamical stability under reducing atmosphere; (2) high catalytic activity; (3) high electric conductivity; (4) high sintering resistance and maintainability of a porous structure; and (5) an equal or approximately equal thermal expansion coefficient with respect to the solid electrolyte.

Conventionally, as a fuel electrode material meeting these properties, nickel powder or nickel oxide powder (nickel oxide changes into nickel when exposed under reducing atmosphere at high temperatures) is frequently used; however, using only nickel powder or nickel oxide powder causes such a problem that nickel particles are mutually sintered when used at high temperatures for a long time, making it hard to maintain a porous structure.

Hence, for example, in order to suppress the mutual sintering of the nickel particles, a mixed powder of nickel powder or nickel oxide powder and a solid electrolyte powder such as yttria-stabilized zirconia (YSZ) (a sintered body of the mixed powder is called a cermet) has frequently been used in recent years.

Additionally, for example, Japanese Patent Application Unexamined Publication No. Hei9-245817 discloses that a surface reforming powder of particles, where a surface part is metallic nickel and titanium oxide is present inside the surface part as an irregularly shaped core, is used as the fuel electrode material in order to prevent degradation in generating performance of the SOFC that is caused by degradation of the fuel electrode due to the sintering of nickel.

In general, the fuel electrode of the SOFC is used under a reducing atmosphere by the fuel gas supplied in the state of power generation. Therefore, nickel in the fuel electrode exists as metallic nickel, which forms, in this state, a network structure where nickel particles are mutually connected, and the network structure acts as an electrically conducting path for the electrons generated in the fuel electrode.

However, when air flows into the fuel electrode due to an abrupt shutdown of the SOFC, a breakdown of a fuel line, or the like, the nickel is oxidized to change into nickel oxide, causing a volumetric expansion. Therefore, the fuel electrode prepared by sintering conventionally known fuel electrode materials has a problem in that the network structure which has been constructed under a reducing atmosphere breaks down when the fuel gas is supplied again to reduce nickel oxide back to nickel, causing performance degradation of the fuel electrode.

Additionally, at startup and shutdown of the SOFC, it generally becomes necessary to perform operations such as fuel purging using an inert gas such as a nitrogen gas in order to maintain a reduction state of the fuel electrode. For this purpose, the SOFC should be regularly equipped with a high-pressure nitrogen cylinder and the like.

However, the regular equipment of the SOFC with the high-pressure nitrogen cylinder and the like raises security concerns and problems such as complicated maintenance of the SOFC. In particular, assuming that the SOFC prevails as a distributed power source intended for home use in the future, it is not practical for every home to be equipped with a nitrogen cylinder.

SUMMARY OF THE INVENTION

An object of the present invention is to overcome the problems described above, and to provide a material for a fuel electrode of a solid oxide fuel cell where a volume change of the fuel electrode can be reduced compared to the conventional materials for fuel electrodes, even if the fuel electrode is exposed to an oxidation-reduction cycle, and to provide a fuel electrode for a solid oxide fuel cell prepared by sintering the material. Another object of the present invention is to provide a solid oxide fuel cell capable of stably maintaining power generation even if a fuel electrode thereof is exposed to an oxidation-reduction cycle.

To achieve these objects, and in accordance with the purpose of the present invention, a material for a fuel electrode of a solid oxide fuel cell is provided, including a material powder containing at least one of nickel and nickel oxide and at, least one of titanium oxide (IV) and a titanium source capable of changing into titanium oxide (IV) by heat treatment in air.

It is preferable that the material powder contains 0.01 to 10 wt % of at least one of the titanium oxide (IV) and the titanium source in titanium oxide (IV) terms with respect to nickel oxide.

Further, it is preferable that the material powder further contains a solid electrolyte exhibiting oxide ion conductivity. It is also preferable that the material powder contains 30-70 wt % of the solid electrolyte with respect to nickel oxide.

Further, it is preferable that a rate of change of length accompanied by oxidation-reduction of a sintered body made by sintering the fuel electrode material, which is measured by a thermomechanical analyzer, is 0.3 wt % or less.

According to another aspect of the present invention, a fuel electrode for a solid oxide fuel cell is provided by sintering the fuel electrode material.

According to yet another aspect of the present invention, a solid oxide fuel cell according to the present invention is provided, including the fuel electrode.

According to the fuel electrode material and the fuel electrode prepared by sintering the same, since the material powder containing the nickel and/or the nickel oxide contains at least titanium oxide (IV) and/or a titanium source which could change into titanium oxide (IV) by heat treatment in air, the volume change of the fuel electrode can be drastically reduced compared to the conventional one, and performance degradation of the fuel electrode accompanied by oxidation-reduction can be minimized even if the fuel electrode is exposed to an oxidation-reduction cycle. When the material powder contains 0.01-10 wt % of titanium oxide (IV) and/or the titanium source in terms of titanium oxide (IV) with respect to nickel oxide, an excellent balance is attained between the effect of reducing the volume change of the fuel electrode and the electric characteristics of the fuel electrode.

In addition, when the material powder further contains a solid electrolyte exhibiting oxide ion conductivity, sintering the nickel particles at the time of steady operation becomes difficult; therefore, degradation of the fuel electrode can be suppressed, and the degradation in the generating performance of the solid oxide fuel cell can also be suppressed. When the material powder contains 30-70 wt % of the solid electrolyte with respect to nickel oxide, an excellent balance is attained between the effect of suppressing the degradation of the fuel electrode and the electric characteristics of the fuel electrode.

On the other hand, according to the solid oxide fuel cell provided with the fuel electrode, even if the fuel electrode is exposed to an oxidation-reduction cycle, the performance degradation or time course degradation of the fuel electrode hardly occurs, and therefore, the power generation can be stably maintained. Thus, the reliability of the cell is improved. In addition, since the need for equipping the regular equipment of the solid oxide fuel cell with a high-pressure nitrogen cylinder and the like is eliminated, there are more advantages in that safety concerns and problems such as complicated maintenance of the cell are solved.

Additional objects and advantages of the invention are set forth in the description which follows, are obvious from the description, or may be learned by practicing the invention. The objects and advantages of the invention may be realized and attained by the fuel electrode material, the fuel electrode, and the solid oxide fuel cell in the claims.

BRIEF DESCRIPTION OF THE DRAWINGS

The accompanying drawings, which are incorporated herein and constitute a part of this specification, illustrate embodiments of the present invention and, together with the description, serve to explain the objects, advantages and principles of the invention. In the drawings.

DETAILED DESCRIPTION OF THE INVENTION

Detailed descriptions of a preferred embodiment of a material for a fuel electrode of a solid oxide fuel cell (hereinafter sometimes referred to as the "present fuel electrode material"), a fuel electrode made from the same (hereinafter sometimes referred to as the "present fuel electrode"), and a solid oxide fuel cell using the fuel electrode (hereinafter sometimes referred to as the "present SOFC") according to the present invention are provided below with reference to the accompanying drawings.

First, the constitution of the present fuel electrode material will be described. The present fuel electrode material includes a nickel-based material powder to which titanium oxide (IV) ($TiO_2$) and a titanium source are added. In the present fuel electrode material, the material powder may contain one or both of nickel (Ni) and nickel oxide (NiO).

When the material powder contains both nickel and nickel oxide, the ratio between them is not particularly limited, and is properly determined in view of cost, availability, the handling properties of the powder, and the like. Incidentally, nickel oxide changes into metallic nickel when exposed under reducing atmosphere at the high temperatures provided during operation of the cell.

On the other hand, one or both of titanium oxide (IV) and the titanium source may be added to the material powder in the present fuel electrode material. In the case of adding both titanium oxide (IV) and the titanium source to the material powder, the ratio between them is not particularly limited, and is properly determined in view of cost, availability, and the like.

Here, the term titanium source describes materials which could change into titanium oxide (IV) by heat treatment in air, but excludes the exact titanium oxide (IV).

Suitable examples of the titanium source include metallic titanium (Ti), titanium oxide such as titanium oxide (II) (TiO) and titanium oxide (III) ($Ti_2O_3$), a halide such as titanium tetrachloride and titanium trichloride, an inorganic compound such as titanium hydride, an organic metal compound such as tetramethoxytitanium, titanium isopropoxide and titania acetyl acetonate, a titanium sulfate solution, and the like. These materials may be used by one or more than one in combination.

When the titanium source is composed of more than one material in combination, the ratio between them is not particularly limited, and is properly determined in view of cost, availability, and the like.

In addition, in the present fuel electrode material, while at least one of the titanium oxide (IV) and the titanium source are added to the material powder, a solid electrolyte exhibiting oxide ion conductivity may be further added thereto. Suitable examples of the solid electrolyte include stabilized zirconia containing at least one oxide selected from scandia ($Sc_2O_3$), yttria ($Y_2O_3$), ceria ($CeO_2$), calcia (CaO), magnesia (MgO) and the like, a ceria-based solid solution containing at least one oxide selected from samarium oxide ($Sm_2O_3$), gadolinium oxide ($Gd_2O_3$), yttria ($Y_2O_3$) and the like, bismuth oxide ($Bi_2O_3$), and the like. These materials may be used by one or more than one in combination.

It is preferable to use stabilized zirconia containing at least one oxide selected from scandia, yttria, and ceria. More specifically, it is preferable to use scandia-stabilized zirconia (ScSZ) containing 8-15 mol %, preferably 9-12 mol % scandia, or the same scandia-stabilized zirconia further containing at least one oxide selected from yttria and ceria in a range of 2 mol % or less and the like.

This is preferred because these materials have a higher oxide ion conductivity than 8YSZ which is frequently conventionally used as a part of the fuel electrode material; therefore, when these materials are added to the material powder, the mutual sintering of nickel particles can be suppressed, and the catalytic activity of the fuel electrode is further enhanced, improving cell performance.

The titanium oxide (IV), the titanium source and the solid electrolyte mentioned above are preferably provided in powder form in view of the ease of uniform mixing with the material powder, but may be in massive form, in grain form, or in solution form.

Here, it is preferable that the material powder contains 0.01-10 wt %, preferably 0.1-5 wt % of one of the titanium oxide (IV) and the titanium source with respect to nickel oxide. This is preferred because an excellent balance is attained between an effect of reducing the volume change of the fuel electrode and the electric characteristics of the fuel electrode if the percentage of the titanium oxide (IV) and/or the titanium source is in the above-described ranges.

When using the phrase "with respect to nickel oxide" in the case of the material powder containing the nickel, the weight of nickel (Ni) contained in the material powder is to be converted to that of nickel oxide (NiO) so as to adapt to the phrase "with respect to nickel oxide."

Further, in the case of the material powder containing the titanium source, the titanium source is added while the weight of titanium (Ti) contained in the titanium source is converted to that of titanium oxide (IV).

In addition, it is preferable that the material powder contains 30-70 wt %, preferably 35-65 wt %, more preferably 40-60 wt % of the solid electrolyte with respect to nickel oxide. This is preferred because an excellent balance is delivered between the effect of suppressing the time course degradation of the fuel electrode and the electric characteristics of the fuel electrode if the percentage of the solid electrolyte is in the above-described ranges.

When using the phrase "with respect to nickel oxide" in the case of this material powder containing the nickel, the same conversion as mentioned above is made so as to adapt to the phrase "with respect to nickel oxide."

In the present fuel electrode material having such a constitution, it is preferable that a rate change of length accompanied by oxidation-reduction of a sintered body prepared by sintering the same, which is measured by a thermomechanical analyzer, is 0.3% or less. Here, the rate of change of length accompanied by oxidation-reduction measured by thermomechanical analyzer may be obtained according to JISR1618 ("Measuring method of thermal expansion of fine ceramics by thermomechanical analysis").

Specifically, the present fuel electrode material is sintered at 1400° C. in air to prepare a sintered sample (of cylinder type of 4-9 mm in diameter and 1-10 mm in length). Then, this sintered sample is placed on the thermomechanical analyzer (e.g. "TMA-4000S" by BRUKER AXS K. K.) and heated to 1000° C. (at a programming rate of 5° C./min) under a reducing atmosphere (a $N_2$/2vol % $H_2$ gas), so that the nickel oxide is reduced to nickel.

Next, air is introduced at the same temperature (1000° C.) to oxidize the sintered sample. Then, the $N_2$/2vol % $H_2$ gas is introduced at the same temperature (1000° C.) to reduce nickel oxide back to nickel. By such operations, the TMA curve (a curve which is described while taking time (hour) as the lateral axis and TMA (%) as the vertical axis) is measured.

Figure 1:
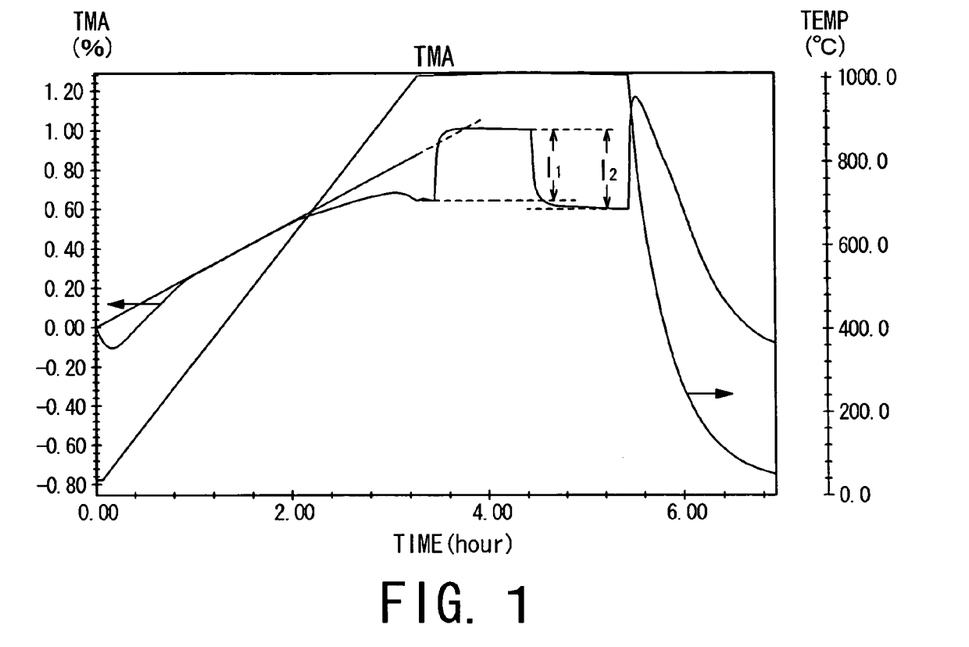
FIG. 1 is a graph schematically showing a TMA curve.

FIG. 1 is a graph schematically showing a TMA curve measured by the above-described operations. The rate (%) of change of the length accompanied by oxidation-reduction of the sintered sample may be read from the TMA curve thus obtained. In FIG. 1, the interval $l_1$ shows a rate (%) of a first length change accompanied by oxidation, and the interval $l_2$ shows a rate (%) of a second length change accompanied by reduction.

Next, a method for producing the present fuel electrode material will be described. The production method thereof is not particularly limited, and various methods may be employed only if they allow the material powder containing the nickel and/or the nickel oxide to contain the titanium oxide (IV) and/or the titanium source and to further contain the solid electrolyte.

Specifically, the mixing of the nickel and/or the nickel oxide and the titanium oxide (IV) and/or the titanium source, or the mixing of the nickel and/or the nickel oxide, the titanium oxide (IV) and/or the titanium source, and the solid electrolyte may be performed by a dry process or may be performed by a wet process while adding the proper solvent.

In addition, the order of mixing three materials including nickel and/or the nickel oxide, titanium oxide (IV) and/or the titanium source, and the solid electrolyte, is not particularly limited. To be more specific, the nickel and/or the nickel oxide and the titanium oxide (IV) and/or the titanium source may first be mixed and then further mixed with the solid electrolyte. Alternatively, the nickel and/or the nickel oxide and the solid electrolyte may be mixed first to be further mixed with the titanium oxide (IV) and/or the titanium source. Alternatively, the solid electrolyte and the titanium oxide (IV) and/or the titanium source may be mixed first to be further mixed with the nickel and/or the nickel oxide. In addition, the three materials may also be mixed at a time.

In view of the fact that the titanium oxide (IV) can easily be made to exist around nickel (nickel oxide) when the volume change accompanied by oxidation-reduction is great, it is preferable that the nickel and/or the nickel oxide and the titanium oxide (IV) and/or the titanium source are mixed first, and then further mixed with the solid electrolyte.

Suitable examples of mixing means are known, and include mixing means such as a ball mill, a sand mill, a vibrating mill and a bead mill. In addition, zirconia balls and various resin balls such as nylon balls can be suitably used as mixing media, and water, alcohol, and the like can be suitably used as a solvent.

When titanium oxide (IV) is contained in the material powder containing nickel oxide, a liquid phase method such as a coprecipitation method may be employed. Specifically, the titanium oxide (IV) may be contained in the material powder containing the nickel oxide by dissolving respective soluble compounds of nickel and titanium in water in a predetermined percentage, mixing an alkaline solution into the mixed aqueous solution, precipitating hydroxide of nickel containing hydroxide of titanium out of the mixed solution, and separating the precipitate to sinter and grind. According to such a method, a uniform fuel electrode material having few impurities can be obtained.

A halide such as chloride, nitrate, sulfate, acetate, and the like may be used for the soluble compound of nickel, and a halide such as chloride, sulfate, and the like may be used as the soluble compound of titanium.

Next, the present fuel electrode and the present SOFC will be described.

Generally, the configuration of an SOFC is broadly divided into a tubular one, a planar one, and a mono block layer one, and the present fuel electrode may be applied to an SOFC having any configuration. To be more specific, the shape of the solid electrolyte of the SOFC is not particularly limited, and may be a tube shape, a planar shape, or a honeycomb shape. In addition, when the solid electrolyte has a planar shape, it may be a self-supporting electrolyte sheet or a supported electrolyte sheet.

In applying the present fuel electrode as the fuel electrode of the SOFC, a solid electrolyte material exhibiting oxide ion conductivity is first molded into a predetermined shape and sintered at a predetermined temperature. Suitable examples of the solid electrolyte material include stabilized zirconia containing at least one oxide selected from scandia, yttria, ceria, calcia, magnesia and the like, and a composite material of such stabilized zirconia with alumina.

More specifically, scandia-stabilized zirconia containing 3-6 mol %, preferably 4-6 mol % scandia, scandia-stabilized zirconia containing 3-6 mol %, preferably 4-6 mol % scandia to which alumina is added in a range of 0.3-5 wt %, preferably 0.5-2 wt %, and the like are suitable considering that an excellent balance is attained between the mechanical characteristics such as strength and toughness and the oxide ion conductivity.

In addition, as a method of molding the solid electrolyte material, an optimum molding method may be employed according to the shape of the SOFC. For example, for molding into a planar shape, press molding, tape casting and the like may be employed. In addition, for molding into a tube or honeycomb shape, extrusion molding, injection molding and the like may be employed. In addition, the optimum sintering temperature condition of the solid electrolyte may be selected according to the composition.

Next, on one side of the obtained solid electrolyte, a slurry containing the present fuel electrode material is printed and sintered to form the present fuel electrode. Similarly, on the other side of the solid electrolyte, slurry containing an air electrode material is printed and sintered to form an air electrode.

Suitable examples of the air electrode material include perovskite type oxide containing transition metal such as $LaSrMnO_3$, $LaCaMnO_3$, $LaSrCoO_3$, $LaSrCoFeO_3$ and $PrSrMnO_3$, a composite material of a solid electrolyte such as yttria-stabilized zirconia containing 8-10 mol %, preferably 8-9 mol % yttria, scandia-stabilized zirconia containing 9-12 mol %, preferably 10-11 mol % scandia and a ceria-based solid solution containing 10-35 mol %, preferably 15-30 mol %, more preferably 20-30 mol % oxide such as $Gd_2O_3$, $Y_2O_3$ and $Sm_2O_3$ with the above-described perovskite type oxide containing transition metal, and the like.

Suitable examples of methods for printing the respective electrode slurries, which are not particularly limited, include screen printing, doctor blade, brushing, spraying, dipping and the like, and the present invention may employ any of these methods. In addition, the thickness and the like of the respective electrodes may be appropriately adjusted in consideration of the shape and the like of the solid electrolyte. In addition, the optimal sintering temperature of the respective electrodes may be selected in accordance with their composition.

Finally, fuel gas supplying means and oxidant gas supplying means are attached to the obtained electrolyte electrode assembly to obtain the present SOFC.

Next, the effect of the present fuel electrode material, the present fuel electrode, and the present SOFC will be described.

Since the present fuel electrode material and the present fuel electrode contain at least one of titanium oxide (IV) and a titanium source which could change into titanium oxide (IV) by heat treatment in air in the material powder containing the nickel and/or the nickel oxide, the volume change of the fuel electrode can be greatly reduced compared to the conventional one, and the performance degradation of the fuel electrode accompanied by oxidation-reduction can be minimized even if the fuel electrode is exposed to an oxidation-reduction cycle.

In general, the fuel electrode of the SOFC is used under a reducing atmosphere by a fuel gas that is supplied in the state of power generation. Therefore, the nickel in the fuel electrode exists as metallic nickel, which forms, in this state, a network structure in which nickel particles are mutually connected, and the network structure forms an electrically conducting path for electrons.

However, if volumetric expansion caused by oxidizing this metallic nickel into nickel oxide and shrinkage caused by reducing nickel oxide back into metallic nickel are repeated, the network structure (the electrically conducting path of electrons) having been first constructed under reducing atmosphere is broken down, causing performance degradation of the fuel electrode.

On the other hand, in the present fuel electrode, the dimensional change of the nickel is greatly reduced, even when exposed to an oxidation-reduction cycle; therefore, the internal network structure resists being broken down and the electric conduction is maintained. In short, the internal fine structure resists being broken down by the oxidation-reduction cycle, so that performance degradation can be prevented. Therefore, the present SOFC can maintain stable power generation even under circumstances where the oxidation-reduction cycle is repeated, thereby improving the reliability of the cell as well.

Further, since the need for using a high-pressure nitrogen cylinder and the like along with the regular equipment of the present SOFC is also reduced, there is an advantage in that safety concerns and problems such as complicated maintenance can be solved.

EXAMPLE

Hereinafter, the present fuel electrode material, the present fuel electrode, and the present SOFC will be concretely described with reference to examples.

Measurement of oxide ion conductivity of solid electrolyte:

First, the oxide ion conductivity of the solid electrolyte which is added to the material powder of the present fuel electrode material was measured. To be more specific, using a general ceramic process, sintered bodies were prepared from stabilized zirconia powders containing various oxides to measure their oxide ion conductivity at 1000° C.

Specifically, a powder of scandia-stabilized zirconia containing 11 mol % scandia (hereinafter referred to as "11ScSZ"), a powder of scandia-stabilized zirconia containing 10 mol % scandia and 1 mol % yttria (hereinafter referred to as "10Sc1YSZ"), a powder of scandia-stabilized zirconia containing 10 mol % scandia and 1 mol % ceria (hereinafter referred to as "10Sc1CeSZ"), a powder of scandia-stabilized zirconia containing 11 mol % scandia to which 1 wt % of alumina was added (hereinafter referred to as "11ScSZ1A"), and a powder of yttria-stabilized zirconia containing 8 mol % yttria (hereinafter referred to as "8YSZ") were sintered at 1400° C. to prepare a 11ScSZ sintered body, a 10Sc1YSZ sintered body, a 10Sc1CeSZ sintered body, an 11ScSZ1A sintered body, and an 8YSZ sintered body, respectively, and these sintered bodies were measured for the oxide ion conductivity at 1000° C., of which results are shown in Table 1.

11ScSZ, 10Sc1YSZ and 10Sc1CeSZ powders produced by DAIICHI KIGENSO KAGAKU KOGYO CO., LTD. were used. The 8YSZ powder was produced by TOSOH CORPORATION.

TABLE 1

| Composition | Oxide Ion Conductivity (S/cm) 1000° C. |
|---|---|
| 11 mol % $Sc_2O_3$-89 mol % $ZrO_2$ (11ScSZ) | 0.310 |
| 10 mol % $Sc_2O_3$-1 mol % $Y_2O_3$-89 mol % $ZrO_2$ (10Sc1YSZ) | 0.304 |
| 10 mol % $Sc_2O_3$-1 mol % $CeO_2$-89 mol % $ZrO_2$ (10Sc1CeSZ) | 0.343 |
| (11 mol % $Sc_2O_3$-89 mol % $ZrO_2$)99 wt %-$Al_2O_3$1 wt % (11ScSZ1A) | 0.290 |
| 8 mol % $Y_2O_3$-92 mol % $ZrO_2$ (8YSZ) | 0.160 |

Table 1 shows that the 11ScSZ, 10Sc1YSZ and 10Sc1CeSZ sintered bodies have high oxide ion conductivity.

Preparation of Fuel Electrode Material

Example 1

First, a solution was prepared by dissolving 40 g of sodium hydroxide in granule form into 756 ml of distilled water, to which an aqueous solution with a 100 g/l concentration which was prepared by dissolving nickel, chloride 6 hydrate was added and then 0.4 ml of titanium tetrachloride (corresponding to 0.3 g of titanium oxide (IV)) was further added, and precipitate obtained therefrom was subjected to filtration cleaning and then dried at 105° C. This dried substance was then heat-treated at 800° C. and ground to synthesize a material powder containing 1 wt % of titanium oxide (IV) with respect to nickel oxide.

Subsequently, a 10Sc1CeSZ powder was weighed out to be 55 wt % with respect to nickel oxide in the material powder, and the material powder and the 10Sc1CeSZ powder were put into a polyethylene pot with zirconia balls and ethanol and mixed for 24 hours. The obtained slurry was then taken out from the pot and dried to obtain a fuel electrode material consistent with the Example 1. In addition, the 10Sc1CeSZ powder was used as the solid electrolyte powder in consideration of the above-described measurement results of the oxide ion conductivity.

Nickel chloride 6 hydrate produced by SUMITOMO METAL MINING CO., LTD. and titanium tetrachloride produced by KANTOU CHEMICAL CO., INC. were used.

Example 2

Next, titanium oxide (IV) (mean particle size of 2 μm) and a 10Sc1CeSZ powder were weighed to be 1 wt % and 55 wt %, respectively, with respect to the nickel oxide powder to be used (mean particle size of 0.5 μm). Then, the nickel oxide powder and the titanium oxide (IV) were mixed for 30 minutes in a wet ball mill, to which a 10Sc1CeSZ powder was further added and mixed for 24 hours. The obtained slurry was then taken out from the ball mill and dried to obtain a fuel electrode material consistent with the Example 2.

Nickel oxide powder produced by SUMITOMO METAL MINING CO., LTD. and titanium oxide (IV) produced by KOJUNDO CHEMICAL LABORATORY CO., LTD. were used.

Comparative Example 1

Next, a 10Sc1CeSZ powder was weighed to be 55 wt % with respect to a nickel oxide powder (mean particle size of 0.5 μm) produced by KOJUNDO CHEMICAL LABORATORY CO., LTD. Then, the nickel oxide powder and the 10Sc1CeSZ powder were mixed for 24 hours in a wet ball mill, and then the obtained slurry was taken out from the ball mill and dried to obtain a fuel electrode material consistent with Comparative Example 1.

Comparative Example 2

Next, a fuel electrode material consistent with Comparative Example 2 was obtained following the same procedure as Comparative Example 1, except that a nickel oxide powder (mean particle size of 0.5 μm) which was experimentally prepared by the present inventors was used.

Measurement of Rate of Length Change Accompanied by Oxidation-Reduction

Next, the fuel electrode materials prepared according to the Examples and Comparative Examples were sintered at 1400° C. in air to prepare sintered samples (9 mm in diameter and 5 mm in length), respectively. Then, these sintered samples were placed on a thermomechanical analyzer ("TMA-4000s" by BRUKER AXS K. K.) and heated to 1000° C. (at a programming rate of 5° C./min) under a reducing atmosphere (an $N_2$/2vol % $H_2$ gas) to reduce the nickel oxide to nickel.

Then, air was introduced at the same temperature (1000° C.) to oxidize the sintered samples, and the $N_2$/2vol % $H_2$ gas was introduced at the same temperature (1000° C.) to reduce the nickel oxide back to nickel.

Figure 2:
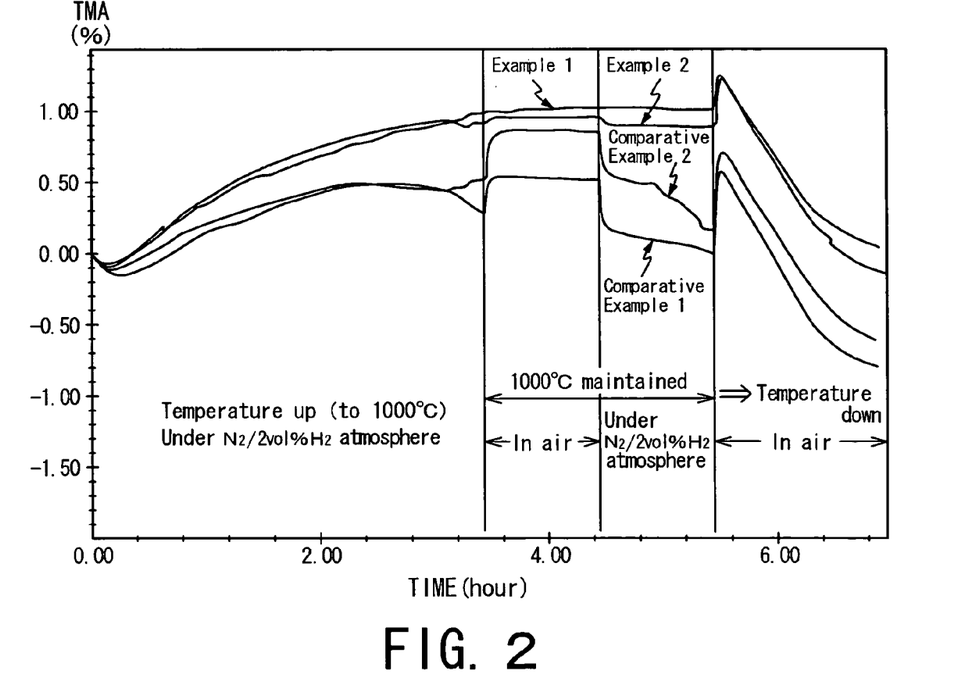
FIG. 2 is a graph showing TMA curves of respective sintered samples prepared by sintering fuel electrode materials consistent with Examples and Comparative Examples.

FIG. 2 is a graph showing measured TMA curves. According to the TMA curves in FIG. 2, the rate $l_1$(%) of first length change accompanied by oxidation and the rate $l_2$(%) of second length change accompanied by reduction were read, and the results are shown in Table 2.

TABLE 2

|  | $I_1$ (Oxidation) | $I_2$ (Reduction) | $I_1$ when Comparative Example 1 is made 100 | $I_2$ when Comparative Example 1 is made 100 |
|---|---|---|---|---|
| Example 1 | 0% | 0% | 0 | 0 |
| Example 2 | 0.04% | 0.06% | 12 | 12 |
| Comarative Example 1 | 0.34% | 0.51% | 100 | 100 |
| Comarative Example 2 | 0.31% | 0.69% | 91 | 135 |

TABLE 2-continued

| $I_1$ (Oxidation) | $I_2$ (Reduction) | $I_1$ when Comparative Example 1 is made 100 | $I_2$ when Comparative Example 1 is made 100 |
| --- | --- | --- | --- |

According to Table 2, it was confirmed that the sintered samples composed of the fuel electrode materials according to Examples 1 and 2 containing titanium oxide (IV) have a rate of change of length, accompanied by oxidation-reduction, of 0.3% or less, which is much lower than that of the sintered samples composed of the fuel electrode materials according to Comparative Examples 1 and 2 which did not contain titanium oxide (IV).

Preparation of an SOFC Single Cell

Next, an SOFC single cell provided with a fuel electrode made by sintering the fuel electrode material according to Example 1 was prepared. To be more specific, scandia-stabilized zirconia containing 4 mol % scandia (hereinafter referred to as "4ScSZ") was used as the solid electrolyte material and a binder was added thereto to make slurry, which was made into a green sheet with a thickness of about 150 μm by the doctor blade method. Then, this green sheet was sintered at 1350° C. for two hours to prepare a solid electrolyte sheet.

Next, a binder (polyethylene glycol) was added to the fuel electrode material consistent with the Example 1 to make slurry, which was painted on one side of the solid electrolyte sheet (in a thickness of about 40 μm) by the screen printing method. This material was then sintered at 1350° C. for two hours to make a fuel electrode.

Subsequently, $LaO_{0.8}Sr_{0.2}MnO_3$ was used as an air electrode material and a binder (polyethylene glycol) was added thereto to make slurry, which was painted on the other side of the solid electrolyte sheet (in a thickness of about 50 μm) by the screen printing method. Then, this material was sintered at 1150° C. for two hours to make an air electrode. In this way, an SOFC single cell A was obtained which was provided with the fuel electrode made by sintering the fuel electrode material according to Example 1.

In addition, as a comparison, SOFC single cells B and C were prepared following the same procedure as SOFC single cell A, except that the fuel electrode materials according to Comparative Examples 1 and 2 were used.

4ScSZ produced by DAIICHI KIGENSO KAGAKU KOGYO CO., LTD. and $La_{0.8}Sr_{0.2}MnO_3$ produced by SEIMI CHEMICAL CO., LTD. were used.

Power Generating Test

Figure 3:
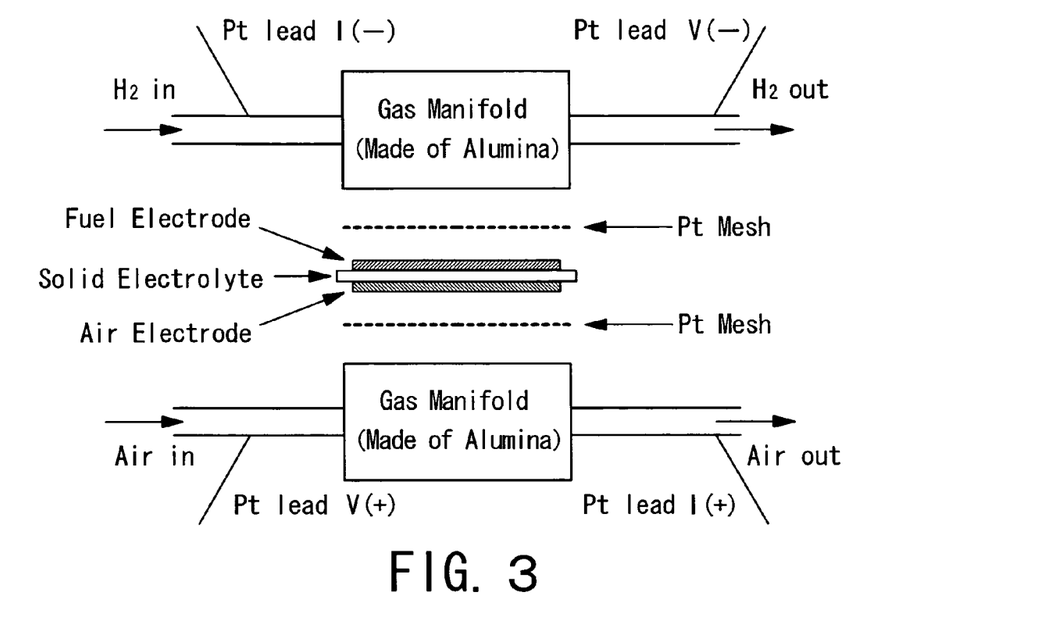
FIG. 3 is a schematic view of a power generation testing device.

Next, a power generating test was conducted using SOFC single cells A to C obtained as described above. To be more specific, as shown in FIG. 3, both outermost surfaces of the SOFC single cell were sandwiched between Pt meshes, and gas manifolds (made of alumina) were further provided on the outer sides of the Pt meshes, to which a fuel gas (hydrogen at the humidity of 3%) and an oxidant gas (air) were supplied.

The power generating temperature was 950° C. in this test. In addition, the fuel gas was humidified at a humidity of 3% via a temperature controllable bubbling vessel, and the gas flow rate at the time of measurement of current density ($A/cm^2$) and output density (V) was 1.0 L/min for humidified hydrogen and 1.0 L/min for air.

Oxidation-Reduction Cycle Test on Fuel Electrode

Next, an oxidation-reduction cycle test was conducted on the fuel electrode during the power generating test which was conducted under a constant load condition of current density of 0.3 $A/cm^2$ while using 20% dilute hydrogen with nitrogen (at a humidity of 3%) as the fuel gas and air as the oxidant gas.

Specifically, while maintaining the power generating temperature at 950° C. after suspending power generation, in the SOFC single cell, operations of opening a fuel gas line to air to force the fuel electrode to oxidize and restoring the fuel gas line after a fixed time to perform power generation again were repeated three times, and an investigation was made on performance degradation of the fuel electrode. At this time, the oxidation of the fuel electrode was confirmed when electromotive force thereof becomes 0V. Incidentally, the gas flow rate at the time of the constant-load power generation was 1.0 L/min for 20% dilute hydrogen with nitrogen and 1.0 L/min for air.

Figure 4:
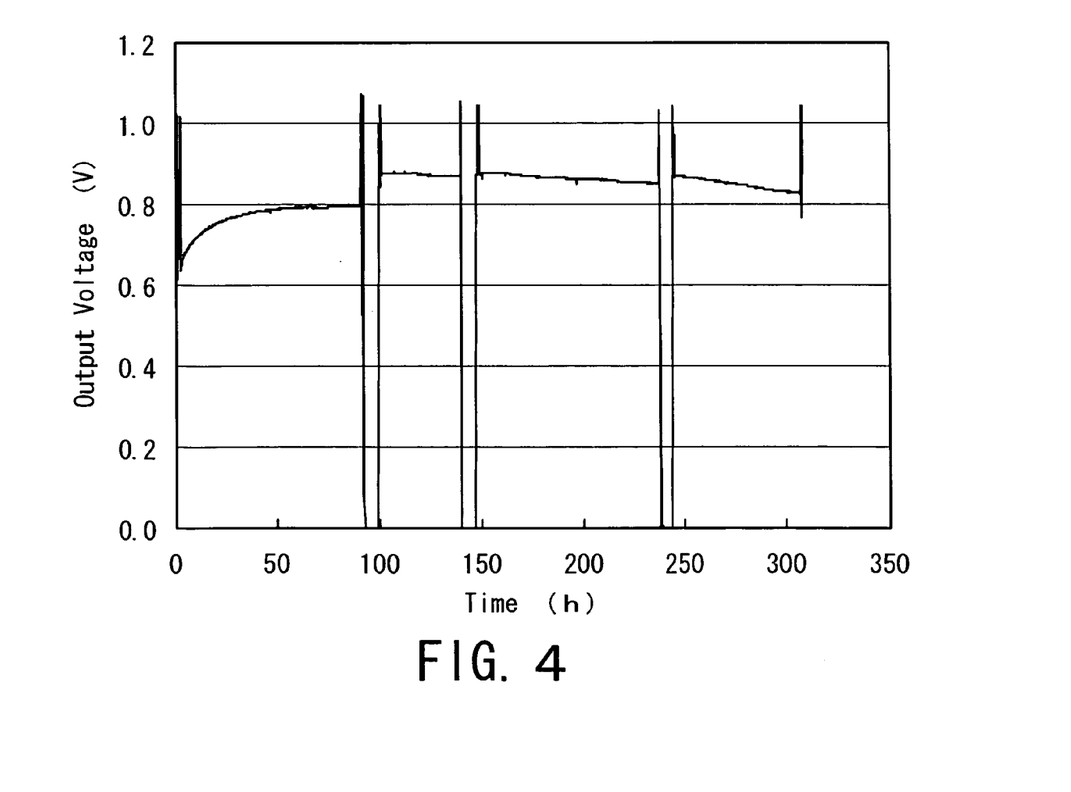
FIG. 4 is a graph showing a relation between power generation time (h) and output voltage (V) of an SOFC single cell A provided with a fuel electrode prepared by sintering the fuel electrode material consistent with the Example 1.
Figure 5:
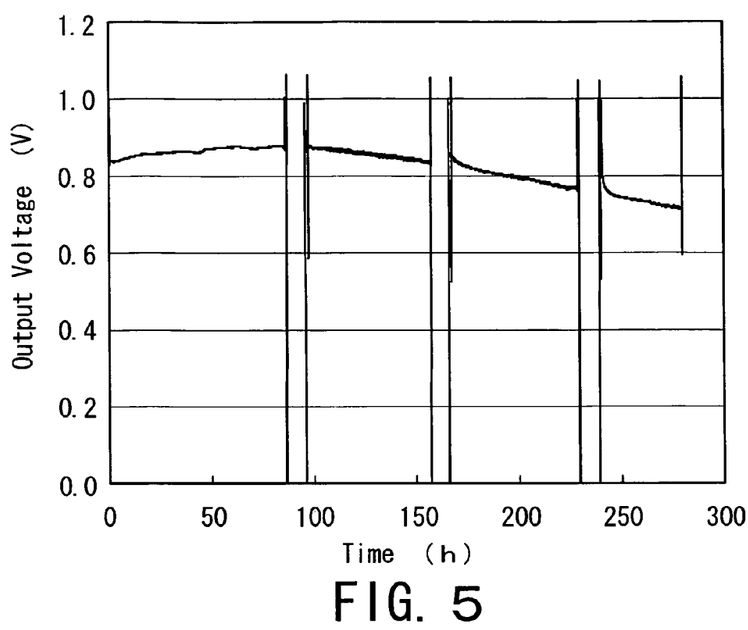
FIG. 5 is a graph showing a relation between power generation time (h) and output voltage (V) of an SOFC single cell B provided with a fuel electrode prepared by sintering the fuel electrode material consistent with the Comparative Example 1.
Figure 6:
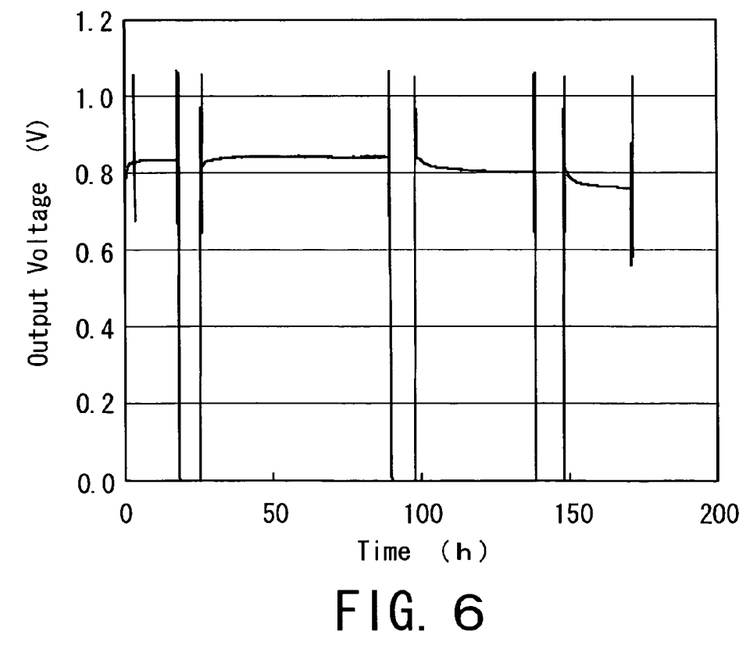
FIG. 6 is a graph showing a relation between power generation time (h) and output voltage (V) of an SOFC single cell C provided with a fuel electrode prepared by sintering the fuel electrode material consistent with the Comparative Example 2.

FIGS. 4 to 6 show a relationship between the power generation time (h) and the output voltage (V) with respect to SOFC single cells A to C. In FIGS. 4 to 6, sections where the electromotive force is as low as 0V represent an oxidation state. In addition, in FIGS. 4 to 6, there are a plurality of sections where the electromotive force is as low as 0V, which respectively correspond to, from left to right along the time axis, the first, the second and the third oxidation-reduction cycle tests.

It was confirmed that with the SOFC single cells B and C according to the Comparative Examples shown in FIGS. 5 and 6, the output voltage (V) was drastically lowered by the repetition of the oxidation-reduction cycle (i.e., the output voltage at the time of reduction describes a downward convex curve). On the other hand, with the SOFC single cell A according to the Example shown in FIG. 4, the degree of performance degradation by the repetition of the oxidation-reduction cycle was small (i.e., the output voltage at the time of reduction describes a straight line), and the power generation can be stably maintained.

This is because, in SOFC single cells B and C according to the Comparative Examples, the network structure in the fuel electrode (the electrically conducting path of electrons), which was constructed under a reducing atmosphere at the beginning of the power generation was broken down by the oxidation-reduction cycle, which caused performance degradation of the fuel electrode. On the other hand, in SOFC single cell A according to the Example, the fine structure inside the fuel electrode is hardly broken down by the oxidation-reduction cycle, so that performance degradation of the fuel electrode can be effectively prevented.

While the material powder was made to contain titanium oxide (IV) powder in the fuel electrode material according to the Example, the titanium sources mentioned above may be applied instead. In addition, while the material powder was made to contain the 10Sc1CeSZ powder in the fuel electrode material according to the Example, the other stabilized zirconia powder, ceria-based solution, and the like mentioned above may be applied instead. In addition, while the fuel electrode material and the fuel electrode according to the present invention were applied to the planar type SOFC, they can be also applied to the SOFC of any other type such as a tubular type SOFC and a monolithic type SOFC.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A powder fuel electrode material for a fuel electrode of a solid oxide fuel cell, the powder fuel electrode material consisting essentially of a mixture of:
   a nickel-based powder material comprising at least one of nickel and nickel oxide; and
   at least one of titanium oxide (IV) and a titanium source capable of changing into titanium oxide (IV) by heat treatment in air mixed into the nickel-based material powder;
   wherein the powder fuel electrode material further contains a solid electrolyte exhibiting oxide ion conductivity, which comprises one of stabilized zirconia containing one or more oxide materials selected from the groups consisting of $Sc_2O_3$, $Y_2O_3$, $CeO_2$, CaO, MgO, a ceria solid solution containing at least one of $Sm_2O_3$, $Gd_2O_3$ and $Y_2O_3$, and $Bi_2O_3$, mixed into the powder fuel electrode material after the at least one of titanium oxide (IV) and the titanium source is mixed into the nickel-based powder material; and
   wherein the powder fuel electrode material contains 35 to 70 wt % of the solid electrolyte with respect to nickel oxide.

2. The powder fuel electrode material according to claim 1, wherein the powder fuel electrode material comprises 0.01 to 10 wt % of the at least one of the titanium oxide (IV) and the titanium source in terms of titanium oxide (IV) with respect to nickel oxide.

3. The powder fuel electrode material according to claim 2, wherein a rate of change of a length accompanied by oxidation-reduction of a sintered body prepared by sintering the powder fuel electrode material is 0.3% or less, as measured by a thermomechanical analyzer.

4. The powder fuel electrode material according to claim 1, wherein a rate of change of a length accompanied by oxidation-reduction of a sintered body prepared by sintering the powder fuel electrode material is 0.3% or less, as measured by a thermomechanical analyzer.

5. A fuel electrode for a solid oxide fuel cell prepared by sintering the powder fuel electrode material according to claim 4.

6. A fuel electrode for a solid oxide fuel cell prepared by sintering the powder fuel electrode material according to claim 1.

7. A solid oxide fuel cell comprising the fuel electrode according to claim 6.

8. The powder fuel electrode material according to claim 1, wherein the powder fuel electrode material comprises at least the titanium source capable of changing into titanium oxide (IV) by heat treatment in air.

* * * * *